US009177692B2

(12) United States Patent
Miyamoto et al.

(10) Patent No.: US 9,177,692 B2
(45) Date of Patent: Nov. 3, 2015

(54) POLYAMIDE RESIN COMPOSITION AND MOLDED ARTICLE COMPRISING THE SAME

(75) Inventors: Akio Miyamoto, Ube (JP); Masuaki Ichikawa, Ube (JP); Tetsuya Yasui, Ube (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 0 days.

(21) Appl. No.: 13/876,517

(22) PCT Filed: Sep. 28, 2011

(86) PCT No.: PCT/JP2011/072205
§ 371 (c)(1),
(2), (4) Date: Mar. 28, 2013

(87) PCT Pub. No.: WO2012/043640
PCT Pub. Date: Apr. 5, 2012

(65) Prior Publication Data
US 2013/0187080 A1     Jul. 25, 2013

(30) Foreign Application Priority Data

Sep. 30, 2010  (JP) ................... 2010-220330
Sep. 30, 2010  (JP) ................... 2010-220337
Nov. 18, 2010  (JP) ................... 2010-257790

(51) Int. Cl.
*B32B 27/30*     (2006.01)
*H01B 3/30*      (2006.01)
(Continued)

(52) U.S. Cl.
CPC *H01B 3/305* (2013.01); *C08K 3/04* (2013.01); *C08K 3/22* (2013.01); *C08K 5/053* (2013.01);
(Continued)

(58) Field of Classification Search
CPC ............ C08K 3/22; C08K 5/053; C08K 7/00; C08K 7/08; C08K 7/18; C08K 2003/222; C08K 2201/005; C08L 77/00; H01B 3/305
USPC ........ 252/74, 75; 523/220; 524/400, 433, 456
See application file for complete search history.

(56) References Cited

U.S. PATENT DOCUMENTS 6,147,146 A     11/2000  Horio et al.
6,313,209 B2 *  11/2001  Urabe et al. ................... 524/447
(Continued)

FOREIGN PATENT DOCUMENTS

EP     1041109 A2 *  10/2000  ............. C08K 5/053
JP     1-213356 A       8/1989
(Continued)

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) dated Apr. 18, 2013, issued in corresponding International Application No. PCT/JP2011/072205. (9 pages).
(Continued)

Primary Examiner — Jane L Stanley
(74) Attorney, Agent, or Firm — Buchanan, Ingersoll & Rooney PC

(57) ABSTRACT

A polyamide resin composition comprising defined amounts of flake graphite, carbon fibers, and polyhydric alcohol. A polyamide resin composition comprising a polyamide resin and, as a property imparting component, at least one member selected from the group consisting of a metal oxide, a nitrogen compound, and a silicon compound, wherein a defined amount of the dicarboxylic acid units of the polyamide resin are oxalic acid. A polyamide resin composition comprising a polyamide resin and a defined amount of metal oxide particles, wherein the metal oxide particles contain those having a particle size of 70 μm or more in an amount of 10 to 50% by mass and those having a particle size of 20 μm or less in an amount of 1 to 50% by mass, based on the total mass of the metal oxide particles.

2 Claims, 1 Drawing Sheet

(51) Int. Cl.
*C08L 77/00* (2006.01)
*C08L 77/06* (2006.01)
*H01B 3/47* (2006.01)
*C08K 3/04* (2006.01)
*C08K 5/053* (2006.01)
*C08K 7/00* (2006.01)
*C08K 7/06* (2006.01)
*C08K 5/16* (2006.01)
*C08K 5/54* (2006.01)
*C08K 3/22* (2006.01)

(52) U.S. Cl.
CPC ... *C08K 5/16* (2013.01); *C08K 5/54* (2013.01); *C08K 7/00* (2013.01); *C08K 7/06* (2013.01); *C08L 77/00* (2013.01); *C08L 77/06* (2013.01); *H01B 3/47* (2013.01); *C08K 2003/222* (2013.01); *C08K 2003/2217* (2013.01); *C08K 2201/005* (2013.01); *C08K 2201/014* (2013.01)

(56) References Cited

U.S. PATENT DOCUMENTS

| | | | | |
|---|---|---|---|---|
| 6,916,863 | B2* | 7/2005 | Hemmings et al. | 523/218 |
| 7,154,270 | B2* | 12/2006 | Arz et al. | 324/318 |
| 7,550,097 | B2* | 6/2009 | Tonapi et al. | 252/512 |
| 2005/0049345 | A1* | 3/2005 | Greiner et al. | 524/404 |
| 2010/0113668 | A1 | 5/2010 | Saga et al. | |
| 2010/0113669 | A1 | 5/2010 | Saga et al. | |
| 2010/0197828 | A1* | 8/2010 | Whaley | 523/351 |

FOREIGN PATENT DOCUMENTS

| | | |
|---|---|---|
| JP | 3-079666 A | 4/1991 |
| JP | 3-081366 A | 4/1991 |
| JP | 8-001663 A | 1/1996 |
| JP | 2003-049081 A | 2/2003 |
| JP | 2007-106902 A | 4/2007 |
| WO | WO 98/21280 A1 | 5/1998 |
| WO | WO 2008/015775 A1 | 2/2008 |
| WO | WO 2008/062844 A1 | 5/2008 |
| WO | WO 2009/151145 A1 | 12/2009 |
| WO | WO 2010/084845 A1 | 7/2010 |

OTHER PUBLICATIONS

International Search Report (PCT/ISA/210) issued on Dec. 27, 2011, by the Japanese Patent Office as the International Searching Authority for International Application No. PCT/JP2011/072205.
Extended Search Report issued in corresponding European application No. 11829193 on Dec. 19, 2014 (7 pages).

* cited by examiner

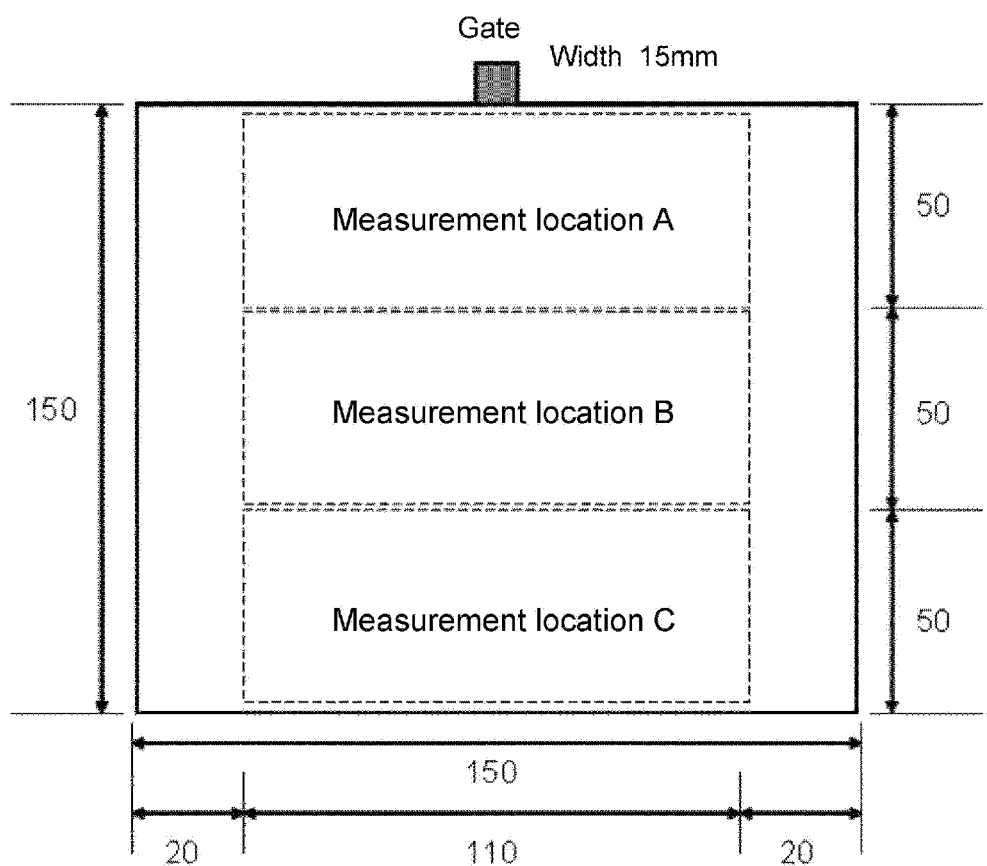

POLYAMIDE RESIN COMPOSITION AND MOLDED ARTICLE COMPRISING THE SAME

FIELD OF THE INVENTION

The present invention relates to a polyamide resin composition having excellent mechanical properties or electrical insulating properties as well as excellent thermal conduction properties and a molded article comprising the same.

BACKGROUND ART

When graphite is incorporated into a thermoplastic resin, the thermal conduction properties of the resin are improved according to the amount of the graphite incorporated. In the thermoplastic resin having incorporated thereinto an increased amount of graphite which is not melted in melt-kneading, the proportion of the thermoplastic resin which is melted in melt-kneading is reduced, and therefore it is difficult to maintain the high productivity of the thermoplastic resin in the melt-kneading using a single-screw or twin-screw extruder. Patent document 1 discloses that kneading is performed in a state such that the head portion of an extruder is opened. However, this patent document has no disclosure of a cooling apparatus, such as a water bath, for efficiently removing heat from the resultant pellets in a flake form, and there is a fear that the pellets stick together, and such kneading is not preferred from the viewpoint of the molding processability.

The thermoplastic resin having graphite solely incorporated thereinto exhibits unsatisfactory physical properties, such as strength. Patent document 2 has a description showing that, by incorporating into a thermoplastic resin specific amounts of graphite and carbon fibers having a thermal conductivity of 100 W/mK or more, the resin is improved in flexural strength and thermal conduction properties. However, there is no disclosure of PAN carbon fibers generally used, which have a thermal conductivity of about 10 W/mK and which are obtained by carbonizing polyacrylonitrile fibers.

Polyamide resins, such as polyamide 6 and polyamide 66, have excellent properties and can be easily melt-molded, and therefore are widely used as general-purpose engineering plastics. Reference documents 3 and 4 disclose that, by incorporating magnesium oxide into the polyamide resin, the resin is improved in thermal conduction properties.

On the other hand, as the increase in density and the miniaturization of an electronic device progress, the amount of the polyamide resin used per part for electronic device is reduced, and hence the effect of the properties of the polyamide resin used on the performance of the part for electronic device is becoming large. In accordance with this, there are increasing demands of the improvement of the properties of the polyamide resin. Especially, there are increasing demands of prevention of the lowering of electrical insulating properties of the polyamide resin, which strongly affects the performance of the part for electronic device, under high-temperature and high-humidity conditions (after a high-temperature and high-humidity treatment), which are presumed to be, for example, under conditions in the summer in Japan.

When magnesium oxide is incorporated into a thermoplastic resin, the thermal conduction properties of the resin are improved according to the amount of the magnesium oxide incorporated. In the thermoplastic resin having incorporated thereinto an increased amount of magnesium oxide which is not melted in melt-kneading, the proportion of the thermoplastic resin which is melted in melt-kneading is reduced, and therefore it is difficult to maintain the high productivity of the thermoplastic resin in the melt-kneading using a single-screw or twin-screw extruder. As a method of stably filling a resin with an increased amount of a conductive filler, patent document 1 discloses that kneading is performed in a state such that the head portion of an extruder is opened. However, there is no disclosure of a method of stably filling a resin with an increased amount of a conductive filler without opening the head portion of the extruder.

Further, patent document 5 discloses a method for improving the moldability, appearance, and thermal conduction properties by incorporating magnesium oxide having a specific particle size in a specific amount. However, in the resultant molded article, the thermal conductivity varies depending on the location of measurement, and there is no disclosure that a molded article exhibiting a uniform thermal conductivity irrespective of location of measurement is stably obtained.

PRIOR ART REFERENCES

Patent Documents

Patent document 1: Japanese Unexamined Patent Publication No. Hei 8-1663

Patent document 2: Japanese Unexamined Patent Publication No. 2003-49081

Patent document 3: Japanese Unexamined Patent Publication No. Hei 1-213356

Patent document 4: Japanese Unexamined Patent Publication No. Hei 3-79666

Patent document 5: Japanese Unexamined Patent Publication No. Hei 3-81366

DISCLOSURE OF THE INVENTION

Problems to be Solved by the Invention

An object of the present invention is to provide a polyamide resin composition having excellent mechanical properties or electrical insulating properties as well as excellent thermal conduction properties and a molded article comprising the same.

Another object of the present invention is to provide a polyamide resin composition which is advantageous not only in that the composition can achieve both high thermal conduction properties and high mechanical properties without using carbon fibers having a thermal conductivity of 100 W/mK or more, but also in that the polyamide resin composition with excellent productivity.

Still another object of the present invention is to provide a polyamide resin composition which is prevented from lowering in electrical insulating properties after a high-temperature and high-humidity treatment, and which exhibits excellent thermal conduction properties.

A further task of the present invention is to provide a polyamide resin composition advantageous in that there can be obtained a molded article which can be stably produced by a general kneader without opening the head portion of the extruder (kneader), and which exhibits uniform thermal conduction properties.

Means to Solve the Problems

The above-mentioned problems are solved by the present invention shown below.

1. A polyamide resin composition comprising a polyamide resin (A) and a property imparting component, the composition being:

(1) a polyamide resin composition which comprises, relative to 100 parts by volume of the polyamide resin (A), as the property imparting component, 50 to less than 100 parts by volume of flake graphite (B), 5 to 40 parts by volume of carbon fibers (C), and 0.1 to 5 parts by volume of a polyhydric alcohol (D);

(2) a polyamide resin composition which comprises the polyamide resin (A) which is a polyamide resin (A1) comprising dicarboxylic acid units (x) and diamine units (y) as constitutional units, and the property imparting component which is at least one member selected from the group consisting of a metal oxide (B1), a nitrogen compound (B2), and a silicon compound (B3), wherein the dicarboxylic acid units (x) of the polyamide resin (A1) are oxalic acid in an amount of 70 mol % or more, based on the total dicarboxylic acid units of the polyamide resin (A1); or (3) a polyamide resin composition which comprises the polyamide resin (A) and metal oxide particles (BB) as the property imparting component, wherein the metal oxide particles (BB) contain those having a particle size of 70 μm or more in an amount of 10 to 50% by mass and those having a particle size of 20 μm or less in an amount of 1 to 50% by mass, based on the total mass of the metal oxide particles, wherein the metal oxide particles (BB) are contained in an amount of 70 to 85% by mass, based on the mass of the polyamide resin composition.

2. The polyamide resin composition according to item 1 above, which comprises, relative to 100 parts by volume of the polyamide resin (A), 50 to less than 100 parts by volume of the flake graphite (B), 5 to less than 40 parts by volume of the carbon fibers (C), and 0.1 to 5 parts by volume of the polyhydric alcohol (D);

3. The polyamide resin composition according to item 2 above, wherein the polyhydric alcohol (D) is a polyhydric alcohol having a melting temperature of 150 to 280° C.;

4. The polyamide resin composition according to item 2 or 3 above, which is obtainable by melt-kneading;

5. The polyamide resin composition according to item 1 above, which comprises the polyamide resin (A1) comprising dicarboxylic acid units (x) and diamine units (y) as constitutional units, and at least one member selected from the group consisting of a metal oxide (B1), a nitrogen compound (B2), and a silicon compound (B3), wherein the dicarboxylic acid units (x) of the polyamide resin (A1) are oxalic acid in an amount of 70 mol % or more, based on the total dicarboxylic acid units of the polyamide resin (A1);

6. The polyamide resin composition according to item 5 above, wherein the metal oxide (B1) is magnesium oxide;

7. The polyamide resin composition according to item 5 or 6 above, which is for use in an electrical insulating part; and 8. The polyamide resin composition according to item 1 above, which comprises the polyamide resin (A) and the metal oxide particles (BB), wherein the metal oxide particles (BB) contain those having a particle size of 70 μm or more in an amount of 10 to 50% by mass and those having a particle size of 20 μm or less in an amount of 1 to 50% by mass, based on the total mass of the metal oxide particles, wherein the metal oxide particles (BB) are contained in an amount of 70 to 85% by mass, based on the mass of the polyamide resin composition;

9. The polyamide resin composition according to item 8 above, which further comprises the polyhydric alcohol (D) in an amount of 0.1 to 5% by mass, based on the mass of the polyamide resin composition;

10. The polyamide resin composition according to item 8 or 9 above, wherein the metal oxide particles (BB) are magnesium oxide;

11. A molded article comprising the polyamide resin composition according to any one of items 1 to 10 above.

Effect of the Invention

By the present inventions 1 to 11, there can be provided a polyamide resin composition which is advantageous in that a molded article having excellent mechanical properties or electrical insulating properties as well as excellent thermal conduction properties can be obtained.

By the present inventions 2 to 4 and 11, further, there can be provided a polyamide resin composition which is advantageous in that a molded article having both excellent thermal conduction properties and excellent mechanical properties can be obtained without using carbon fibers having a thermal conductivity of 100 W/mK or more, and there can be provided a method which can stably pelletize the polyamide resin composition by a general twin-screw extruder.

By the present inventions 5 to 7 and 11, further, there can be provided a polyamide resin composition which is advantageous in that a molded article having excellent electrical insulating properties even after a high-temperature and high-humidity treatment and having both excellent thermal conduction properties and excellent mechanical properties can be obtained. The polyamide resin composition has especially excellent electrical insulating properties after a high-temperature and high-humidity treatment, and therefore can be preferably used as an electrical insulating material in an electrical insulating part.

By the present inventions 8 to 11, further, there can be provided a polyamide resin composition which is advantageous in that there can be obtained a molded article which can be stably produced by a general kneader without opening the head portion of the kneader, and which exhibits uniform thermal conduction properties.

BRIEF DESCRIPTION OF THE DRAWING

FIG. 1 is a view showing locations of measurement of thermal conductivity for evaluating the thermal conduction properties.

BEST MODE FOR CARRYING OUT THE INVENTION

The present invention is directed to a polyamide resin composition comprising polyamide resin (A) and a property imparting component, wherein the composition is:

(1) a polyamide resin composition which comprises, relative to 100 parts by volume of polyamide resin (A), as the property imparting component, 50 to less than 100 parts by volume of flake graphite (B), 5 to 40 parts by volume of carbon fibers (C), and 0.1 to 5 parts by volume of polyhydric alcohol (D);

(2) a polyamide resin composition which comprises polyamide resin (A) which is polyamide resin (A1) comprising dicarboxylic acid units (x) and diamine units (y) as constitutional units, and the property imparting component which is at least one member selected from the group consisting of metal oxide (B1), nitrogen compound (B2), and silicon compound (B3), wherein dicarboxylic acid units (x) of polyamide resin (A1) are oxalic acid in an amount of 70 mol % or more, based on the total mole of the dicarboxylic acid units of polyamide resin (A1); or (3) a polyamide resin composition which comprises polyamide resin (A) and metal oxide particles (BB) as the property imparting component, wherein metal oxide particles (BB) contain those having a particle size of 70 pin or more in an amount of 10 to 50% by mass and those having a particle size of 20 μm or less in an amount of 1 to 50% by mass, based on the total mass of the metal oxide particles, wherein metal oxide particles (BB) are contained in an amount of 70 to 85% by mass, based on the mass of the polyamide resin composition.

[Polyamide Resin Composition A]

The present invention can be polyamide resin composition A which comprises, relative to 100 parts by volume of polyamide resin (A), 50 to less than 100 parts by volume of flake graphite (B), 5 to 40 parts by volume of carbon fibers (C), and 0.1 to 5 parts by volume of polyhydric alcohol (D).

The part(s) by volume used in the present invention is determined as follows. Volumes of polyamide resin (A), flake graphite (B), carbon fibers (C), and polyhydric alcohol (D) are individually determined from the respective masses and the respective specific gravities under atmospheric pressure (1 atm.) at 25° C., and, relative to 100 parts by volume of polyamide resin (A), part(s) by volume of each of flake graphite (B), carbon fibers (C), and polyhydric alcohol (D) is determined.

[Polyamide Resin (A)]

With respect to polyamide resin (A) used in polyamide resin composition A of the present invention, there is no particular limitation as long as it is a polyamide resin obtained by polymerization or copolymerization by a known method, such as melt polymerization, solution polymerization, or solid-phase polymerization.

Examples of polyamide resins (A) include polycaprolactam (polyamide 6), polyundecanelactam (polyamide 11), polydodecanelactam (polyamide 12), polyethyleneadipamide (polyamide 26), polytetramethyleneadipamide (polyamide 46), polyhexamethyleneadipamide (polyamide 66), polyhexamethyleneazelamide (polyamide 69), polyhexamethylenesebacamide (polyamide 610), polyhexamethyleneundecamide (polyamide 611), polyhexamethylenedodecamide (polyamide 612), polyhexamethyleneterephthalamide (polyamide 6T), polyhexamethyleneisophthalamide (polyamide 6I), polyhexamethylenehexahydroterephthalamide (polyamide 6T(H)), polynonamethyleneadipamide (polyamide 96), polynonamethyleneazelamide (polyamide 99), polynonamethylenesebacamide (polyamide 910), polynonamethylenedodecamide (polyamide 912), polynonamethyleneterephthalamide (polyamide 9T), polytrimethylhexamethyleneterephthalamide (polyamide TMHT), polynonamethylenehexahydroterephthalamide (polyamide 9T(H)), polynonamethylenenaphthalamide (polyamide 9N), polydecamethyleneadipamide (polyamide 106), polydecamethyleneazelamide (polyamide 109), polydecamethylenedecamide (polyamide 1010), polydecamethylenedodecamide (polyamide 1012), polydecamethyleneterephthalamide (polyamide 10T), polydecamethylenehexahydroterephthalamide (polyamide 10T(H)), polydecamethylenenaphthalamide (polyamide 10N), polydodecamethyleneadipamide (polyamide 126), polydodecamethyleneazelamide (polyamide 129), polydodecamethylenesebacamide (polyamide 1210), polydodecamethylenedodecamide (polyamide 1212), polydodecamethyleneterephthalamide (polyamide 12T), polydodecamethylenehexahydroterephthalamide (polyamide 12T(H)), polydodecamethylenenaphthalamide (polyamide 12N), polymetaxylyleneadipamide (polyamide MXD6), polymetaxylylenesuberamide (polyamide MXD8), polymetaxylyleneazelamide (polyamide MXD9), polymetaxylylenesebacamide (polyamide MXD10), polymetaxylylenedodecamide (polyamide MXD12), polymetaxylyleneterephthalamide (polyamide MXDT), polymetaxylyleneisophthalamide (polyamide MXDI), polymetaxylylenenaphthalamide (polyamide MXDN), polybis(4-aminocyclohexyl)methanedodecamide (polyamide PACM12), polybis(4-aminocyclohexyl)methaneterephthalamide (polyamide PACMT), polybis(4-aminocyclohexyl)methaneisophthalamide (polyamide PACMI), polybis(3-methyl-4-aminocyclohexyl)methanedodecamide (polyamide dimethylPACM12), polyisophoroneadipamide (polyamide IPD6), polyisophoroneterephthalamide (polyamide IPDT), and polyamide copolymers using a raw material monomer for the above resins. These can be used individually or in combination. Of these, preferred are polyamide 6, polyamide 12, polyamide 66, polyamide 6/66 copolymer (which indicates a copolymer of polyamide 6 and polyamide 66; hereinafter, a copolymer is indicated according to the same manner), polyamide 6/69 copolymer, polyamide 6/610 copolymer, polyamide 6/611 copolymer, polyamide 6/612 copolymer, polyamide 6/12 copolymer, polyamide 6/66/12 copolymer, polyamide 6/IPD6 copolymer, and polyamide MXD6, more preferred are polyamide 6, polyamide 12, polyamide 66, polyamide 6/66 copolymer, polyamide 6/12 copolymer, polyamide 6/IPD6 copolymer, and polyamide 6/66/12 copolymer, and further preferred are polyamide 6, polyamide 66, and polyamide 6/66 copolymer, and, from the viewpoint of achieving excellent molding processability, polyamide 6 is especially preferred.

With respect to the type of the terminal group, the concentration, and the molecular weight distribution of polyamide resin (A) in the present invention, there is no particular limitation, and, for controlling the molecular weight and stabilizing the melted resin during the molding, as a molecular weight modifier, a monocarboxylic acid, such as acetic acid or stearic acid, a diamine, such as metaxylylenediamine or isophoronediamine, a monoamine, and a dicarboxylic acid can be used individually or in appropriate combination.

Polyamide resin (A) can be produced by means of an apparatus for producing polyamide, e.g., a batch reactor, a single-reactor or multi-reactor continuous reaction apparatus, a tubular continuous reaction apparatus, or a kneading reaction extruder, such as a single-screw extruder or a twin-screw extruder.

Examples of polymerization methods include melt polymerization, solution polymerization, and solid-phase polymerization. These polymerization methods can be conducted by repeating operations under atmospheric pressure, under a reduced pressure, and under a pressure, and can be used individually or in appropriate combination.

The relative viscosity of polyamide resin (A), as measured in accordance with JIS K-6920 under conditions such that the concentration of the polyamide in 96% by mass sulfuric acid is 1% by mass and the temperature is 25° C., is preferably 1.0 to 6.0, especially preferably 1.5 to 5.0, more preferably 1.7 to 4.5. When the relative viscosity of the polyamide resin is less than the above-mentioned value, the resultant molded article may be reduced in mechanical properties. On the other hand, when the relative viscosity of the polyamide resin exceeds the above-mentioned value, the viscosity of the melted composition may be increased, making it difficult to mold the composition into a molded article. Further, from the viewpoint of achieving excellent productivity of the polyamide resin composition of the present invention and excellent moldability of the molded article, the relative viscosity of polyamide resin (A) is further preferably 2.0 to 3.0.

With respect to the water extraction of polyamide resin (A) as measured in accordance with the method described in JIS K-6920 for measuring a low molecular-weight substance content, there is no particular limitation, but there is a possibility that gas and others generated during the molding cause environmental problems, or adhere to the production facilities to lower the productivity or adhere to product pellets to cause the appearance to be poor, and therefore the water extraction of polyamide resin (A) is preferably 5% by mass or less.

The form of particles of polyamide resin (A) is preferably a powdery form having an average particle size of 1 mm or less from the viewpoint of uniformly mixing flake graphite (B) and other additives. With respect to the method for obtaining a powdery form, there is no particular limitation, but, from the viewpoint of achieving excellent productivity of the powder, freeze-grinding is preferred.

In polyamide resin (A) in the present invention, various additives and modifiers generally incorporated to a resin can be added in such an amount that the properties of the resultant molded article are not sacrificed. For example, a heat stabilizer, an ultraviolet light absorber, a light stabilizer, an antioxidant, an antistatic agent, a lubricant, an anti-blocking agent, a filler, a tackifier, a sealing property improving agent, an anti-fogging agent, a crystal nucleating agent, a release agent, a plasticizer, a crosslinking agent, a foaming agent, a coloring agent (e.g., a pigment or a dye), and the like can be added. With respect to the method for adding the above additive, there is no particular limitation, and various types of methods conventionally known can be employed. For example, the additive can be added by a dry blending method, or by a melt kneading method, together with another component incorporated if necessary. Melt-kneading can be made using a kneader, such as a single-screw extruder, a twin-screw extruder, a kneader, or a Banbury mixer.

Polyamide resin composition A of the present invention contains flake graphite (B), carbon fibers (C), and polyhydric alcohol (D).

[Flake Graphite (B)]

Flake graphite (B) used in polyamide resin composition A of the present invention is obtained by refining natural graphite and processing the resultant graphite having an increased purity into a flake form. With respect to the average particle size of the flake graphite, there is no particular limitation, but the average particle size is generally 1 to 100 μm, preferably 5 to 80 μm. When the average particle size of the flake graphite is less than 1 μm, the flake graphite has an increased bulk specific gravity, that is, the volume of air per unit volume is increased, and therefore the weight of the graphite which can be introduced to a hopper during the melt-kneading is reduced, and thus the number of the operations of introducing the graphite to the hopper is inevitably increased, and this is not preferred from the viewpoint of production efficiency. On the other hand, when the average particle size of the flake graphite is 100 μm or more, mechanical strength, such as an impact strength, tends to lower.

With respect to the aspect ratio (average particle size/average thickness) of flake graphite (B) used in polyamide resin composition A of the present invention, there is no particular limitation, but, from the viewpoint of achieving excellent mechanical properties including impact strength and excellent thermal conduction properties, the aspect ratio is advantageously 30 to 300 on average, preferably 30 to 200 on average, more preferably 30 to 150 on average.

From the viewpoint of achieving excellent productivity and excellent thermal conduction properties as well as excellent mechanical properties, the amount of flake graphite (B) incorporated into polyamide resin composition A of the present invention is, relative to 100 parts by volume of polyamide resin (A), preferably 50 to less than 100 parts by volume, more preferably 60 to 97 parts by volume, further preferably 70 to 93 parts by volume, especially preferably more than 80 to 91 parts by volume.

[Carbon Fibers (C)]

Carbon fibers (C) used in polyamide resin composition A of the present invention are PAN carbon fibers obtainable by carbonizing polyacrylonitrile fibers.

With respect to the fiber length of carbon fibers (C), short fibers may be used according to the use, and continuous fibers having a fiber length as large as 1,000 mm may be used, and, from the viewpoint of achieving excellent productivity including feeding properties to a twin-screw extruder, the fiber length of the carbon fibers before kneaded is preferably 0.1 to 20 mm, more preferably 1 to 15 mm.

With respect to the fiber diameter of carbon fibers (C), there is no particular limitation. The carbon fibers having a smaller fiber diameter are likely to exhibit a strength in the resin composition or molded article, but the carbon fibers having too small a fiber diameter may be fibrillated, for example, when being fed to a kneader, lowering the production efficiency in the kneading. From the viewpoint of achieving excellent productivity in a kneader and excellent mechanical properties including strength, the fiber diameter is preferably 5 to 15 μm. A masterbatch preliminarily having carbon fibers contained in a resin at a high content or granulated carbon fibers are unlikely to cause the carbon fibers to be fibrillated during the production of the polyamide resin composition of the present invention, and therefore are preferred when using carbon microfibers.

From the viewpoint of achieving excellent productivity and excellent thermal conduction properties as well as excellent mechanical properties, the amount of carbon fibers (C) incorporated into polyamide resin composition A of the present invention is, relative to 100 parts by volume of polyamide resin (A), preferably 5 to less than 40 parts by volume, more preferably 6 to 30 parts by volume, further preferably 8 to 20 parts by volume.

[Polyhydric Alcohol (D)]

With respect to the polyhydric alcohol used in polyamide resin composition A of the present invention, there is no particular limitation, but a polyhydric alcohol having a melting temperature of 150 to 280° C. is preferred. The melting temperature means a temperature at an endothermic peak (melting point) as measured by differential scanning calorimetry (DSC) used for measuring a melting point and a freezing point of a resin. Examples of polyhydric alcohols having a melting temperature of 150 to 280° C. include pentaerythritol, dipentaerythritol, and trimethylolethane, and these can be used in combination. From the viewpoint of achieving excellent kneading properties and excellent moldability, pentaerythritol and/or dipentaerythritol is preferred.

Further, from the viewpoint of achieving excellent kneading properties and excellent moldability, the amount of polyhydric alcohol (D) incorporated into polyamide resin composition A of the present invention is, relative to 100 parts by volume of the polyamide resin, preferably 0.1 to 5 parts by volume, more preferably 0.5 to 3 parts by volume.

In polyamide resin composition A, from the viewpoint of achieving excellent productivity and excellent thermal conduction properties as well as excellent mechanical properties, the amount of flake graphite (B) is, relative to 100 parts by volume of polyamide resin (A), preferably 50 to less than 100 parts by volume, more preferably 97 parts by volume or less, further preferably 70 to 93 parts by volume, especially preferably more than 80 to 91 parts by volume. From the viewpoint of achieving excellent productivity and excellent thermal conduction properties as well as excellent mechanical properties, the amount of carbon fibers (C) is, relative to 100 parts by volume of polyamide resin (A), preferably 5 to less than 40 parts by volume, more preferably 6 to 30 parts by volume, more preferably 8 to 20 parts by volume. From the viewpoint of achieving excellent kneading properties and excellent moldability, the amount of polyhydric alcohol (D) is, relative to 100 parts by volume of polyamide resin (A), preferably 0.1 to 5 parts by volume, more preferably 0.5 to 3 parts by volume.

With respect to the method for producing polyamide resin composition A of the present invention, there is no particular limitation as long as the composition is produced by melt-kneading, and various types of methods conventionally known can be employed. For example, the polyamide resin composition can be produced using a kneader, such as a single-screw extruder, a twin-screw extruder, a kneader, or a Banbury mixer. Especially, the polyamide resin composition of the present invention can be preferably produced using a single-screw extruder or a twin-screw extruder.

As a method for molding polyamide resin composition A of the present invention into a molded article, a molding method, such as injection, extrusion, or pressing, can be employed. The polyamide resin composition can be processed by the above molding method into, e.g., a molded article or a sheet.

The molded product using polyamide resin composition A of the present invention can be used in various types of molded articles, sheets and fibers in which a molded product of a polyamide resin composition has conventionally been used, and a wide variety of applications, such as automobile members, computers and associated devices, optical device members, electric and electronic devices, information and communication devices, precision devices, civil engineering and construction products, medical products, and household products. The molded product using polyamide resin composition A is especially useful in applications, such as automobiles and electric and electronic devices.

[Polyamide Resin Composition B]

The present invention can be polyamide resin composition B which comprises polyamide resin (A1) comprising dicarboxylic acid units (x) and diamine units (y) as constitutional units, and at least one member selected from the group consisting of metal oxide (B1), nitrogen compound (B2), and silicon compound (B3), wherein dicarboxylic acid units (x) of polyamide resin (A1) are oxalic acid in an amount of 70 mol % or more, based on the total mole of dicarboxylic acid units of polyamide resin (A1).

[Polyamide Resin (A1)]

In polyamide resin (A1) in polyamide resin composition B of the present invention, dicarboxylic acid units (x) are oxalic acid in an amount of 70 mol % or more, preferably 80 mol % or more, more preferably 90 mol % or more, further preferably 98 to 100 mol %, based on the total mole of the dicarboxylic acid units.

With respect to the oxalic acid source of dicarboxylic acid units (x), an oxalic diester is used, and, with respect to the oxalic diester, there is no particular limitation as long as it has reactivity with an amino group, and examples include oxalic diesters of an aliphatic monohydric alcohol, such as dimethyl oxalate, diethyl oxalate, di-n-(or i-)propyl oxalate, and di-n-(, i-, or t-)butyl oxalate; oxalic diesters of an alicyclic alcohol, such as dicyclohexyl oxalate; and oxalic diesters of an aromatic alcohol, such as diphenyl oxalate.

Among the above-mentioned oxalic diesters, preferred are oxalic diesters of an aliphatic monohydric alcohol having more than 3 carbon atoms, oxalic diesters of an alicyclic alcohol, and oxalic diesters of an aromatic alcohol, and, of these, more preferred are dibutyl oxalate and diphenyl oxalate.

Polyamide resin (A1) can contain other dicarboxylic acid units (x), lactam units, and aminocarboxylic acid units as long as dicarboxylic acid units (x) comprise oxalic acid in an amount of 70 mol % or more, based on the total mole of the dicarboxylic acid units.

Examples of other dicarboxylic acid units include aliphatic dicarboxylic acids, such as malonic acid, dimethyl malonate, succinic acid, glutaric acid, adipic acid, pimelic acid, suberic acid, azelaic acid, sebacic acid, undecanedicarboxylic acid, dodecanedicarboxylic acid, tridecanedicarboxylic acid, tetradecanedicarboxylic acid, pentadecanedicarboxylic acid, hexadecanedicarboxylic acid, octadecanedicarboxylic acid, and eicosanedicarboxylic acid; alicyclic dicarboxylic acids, such as 1,3-/1,4-cyclohexanedicarboxylic acid, dicyclohexanemethane-4,4'-dicarboxylic acid, and norbornanedicarboxylic acid; and aromatic dicarboxylic acids, such as isophthalic acid, terephthalic acid, and 1,4-/2,6-/2,7-naphthalenedicarboxylic acid. These can be used individually or in combination.

Examples of lactam units include caprolactam, enantholactam, undecanelactam, dodecanelactam, and α-pyrrolidone. These can be used individually or in combination.

Examples of aminocarboxylic acid units include aminocaproic acid and aminododecanoic acid.

In polyamide resin composition B of the present invention, examples of diamine units (y) of polyamide resin (A1) include aliphatic diamines, such as 1,2-ethylenediamine, 1,3-trimethylenediamine, 1,4-tetramethylenediamine, 1,5-pentamethylenediamine, 1,6-hexamethylenediamine(1,6-hexanediamine), 1,7-heptamethylenediamine, 1,8-octamethylenediamine, 1,9-nonamethylenediamine, 2-methyl-1,8-octanediamine, 1,10-decamethylenediamine, 1,11-undecamethylenediamine, 1,12-dodecamethylenediamine, 1,13-tridecamethylenediamine, 1,14-tetradecamethylenediamine, 1,15-pentadecamethylenediamine, 1,16-hexadecamethylenediamine, 1,17-heptadecamethylenediamine, 1,18-octadecamethylenediamine, 1,19-nonadecamethylenediamine, 1,20-cicosamethylenediamine, 2-/3-methyl-1,5-pentanediamine, 2-methyl-1,8-octanediamine, 2,2,4-/2,4,4-trimethylhexamethylenediamine, and 5-methyl-1,9-nonanediamine; alicyclic diamines, such as 1,3-/1,4-cyclohexanediamine, 1,3-/1,4-cyclohexanedimethylamine, bis(4-aminocyclohexyl)methane, bis(4-aminocyclohexyl)propane, bis(3-methyl-4-aminocyclohexyl)methane, bis(3-methyl-4-aminocyclohexyl)propane, 5-amino-2,2,4-trimethyl-1-cyclopentanemethylamine, 5-amino-1,3,3-trimethylcyclohexanemethylamine(isophoronediamine), bis(aminopropyl)piperazine, bis(aminoethyl)piperazine, norbornanedimethylamine, and tricyclodecanedimethylamine; and aromatic diamines, such as p-phenylenediamine, m-phenylenediamine, m-xylylenediamine, p-xylylenediamine, 4,4'-diaminodiphenyl sulfone, and 4,4'-diaminodiphenyl ether. Of these, preferred are 1,6-hexamethylenediamine(1,6-hexanediamine), 1,9-nonamethylenediamine, 2-methyl-1,8-octanediamine, 1,10-decamethylenediamine, 1,11-undecamethylenediamine, 1,12-dodecamethylenediamine, m-xylylenediamine, and p-xylylenediamine, more preferred are 1,6-hexamethylenediamine(1,6-hexanediamine), 1,9-nonamethylenediamine, 2-methyl-1,8-octanediamine, and m-xylylenediamine, and further preferred are 1,9-nonamethylenediamine and 2-methyl-1,8-octanediamine. These can be used individually or in combination.

When 1,9-nonamethylenediamine and 2-methyl-1,8-octanediamine are mixed, molar ratio of the 1,9-nonamethylenediamine to 2-methyl-1,8-octanediamine is 1:99 to 99:1, preferably 5:95 to 95:5, more preferably 5:95 to 40:60 or 60:40 to 95:5, particularly 5:95 to 30:70 or 70:30 to 90:10. By copolymerizing 1,9-nonamethylenediamine and 2-methyl-1, 8-octanediamine in the above-mentioned specific amounts, there can be obtained polyamide resin (A1) advantageous not only in that it has a broad width of the temperature at which the resin can be molded, but also in that it exhibits excellent melt moldability as well as excellent chemical resistance and excellent resistance to hydrolysis.

In polyamide resin composition B of the present invention, specific examples of polyamide resins (A1) include polyamide 62, polyamide 82, polyamide 92, polyamide 102, polyamide 122, polyamide 62/92 copolymer, polyamide 62/102 copolymer, polyamide 62/122 copolymer, polyamide 92/102 copolymer, and polyamide 92/122 copolymer. These can be used individually or in combination. From the viewpoint of achieving excellent resistance to hydrolysis and excellent molding processability, preferred are polyamide 92, polyamide 122, and polyamide 62/92 copolymer, and polyamide 92 is more preferred.

Polyamide resin (A1) in polyamide resin composition B of the present invention is a polymer comprising a salt of oxalic acid which is a dicarboxylic acid, and a diamine as polymerization units, and therefore is generally called polyamide. A salt of oxalic acid and a diamine is referred to as oxamide, and hence a polymer comprising an oxamide as polymerization units is referred to also as polyoxamide.

Polyamide resin (A1) used in polyamide resin composition B of the present invention can be produced using an arbitrary method known as a method for producing polyamide, for example, a solution polymerization method, an interfacial polymerization method, a melt polymerization method, or a solid-phase polymerization method. Specifically, the polyamide resin can be obtained by reacting a diamine and an oxalic diester with each other in a batchwise manner or in a continuous manner, and the operations for the production are preferably conducted in the order of (i) the former polymerization step and (ii) the latter polymerization step shown below.

In the former polymerization step (i), after or while purging a reactor with nitrogen, dicarboxylic acid units (x) and diamine units (y) are mixed with each other. A solvent capable of dissolving therein both dicarboxylic acid units (x) and diamine units (y) may be used in mixing them. With respect to the solvent capable of dissolving therein both diamine units (y) and an oxalic diester as dicarboxylic acid units (x), there is no particular limitation, but, for example, toluene, xylene, trichlorobenzene, phenol, or trifluoroethanol can be used, and toluene can be especially preferably used. For example, a toluene solution having a diamine dissolved is heated to 50° C. and then, an oxalic diester is added to the solution. In this instance, the ratio of the charged oxalic diester to the charged diamine is 0.8 to 1.5, preferably 0.91 to 1.1, further preferably 0.99 to 1.01, in terms of the oxalic diester/diamine ratio (molar ratio).

The elevation of the temperature in the reactor into which the materials are charged as mentioned above is started under atmospheric pressure while stirring and/or introducing a jet of bubbles using nitrogen, so that the temperature in the reactor and the pressure in the reactor preferably finally become 100 to 270° C. and atmospheric pressure, respectively, in this step.

In the latter polycondensation step (ii), for further increasing the molecular weight of the polymerization product formed in the previous step, the temperature of the polymerization product formed in the previous step is gradually elevated in the reactor under atmospheric pressure. In the temperature elevation process, the temperature is elevated from the final temperature in the former polycondensation step finally to a temperature in the range of 220 to 300° C., preferably 230 to 280° C., further preferably 240 to 270° C. The reaction is preferably conducted for 1 to 8 hours, preferably 2 to 6 hours, including the temperature elevation time. Further, in the latter polymerization step, if necessary, the polymerization can be conducted under a reduced pressure.

In the production of polyamide resin (A1), as a catalyst, phosphoric acid, phosphorous acid, hypophosphorous acid, or a salt or ester thereof can be used. Specific examples of catalysts include metal salts, such as potassium, sodium, magnesium, vanadium, calcium, zinc, cobalt, manganese, tin, tungsten, germanium, titanium, and antimony salts, ammonium salts, ethyl esters, isopropyl esters, butyl esters, hexyl esters, isodecyl esters, octadecyl esters, decyl esters, stearyl esters, and phenyl esters.

With respect to the relative viscosity of polyamide resin (A1) in polyamide resin composition B of the present invention, there is no particular limitation, but, from the viewpoint of achieving excellent molding processability and excellent impact properties, the relative viscosity of a solution having a polyamide resin concentration of 1.0 g/dl using 96% by mass sulfuric acid as a solvent as measured at 25° C. is preferably 1.8 to 6.0, more preferably 2.0 to 5.5, further preferably 2.5 to 4.5.

In polyamide resin composition B of the present invention, with respect to the melting temperature of polyamide resin (A1), there is no particular limitation, but the melting temperature is preferably 150 to 350° C., and, from the viewpoint of achieving excellent molding processability, the melting temperature of polyamide resin (A1) is more preferably 200 to 300° C.

With respect to the form of particles of polyamide resin (A1), there is no particular limitation, but, from the viewpoint of uniformly mixing metal oxide (B1), a powdery form having an average particle size of 1 mm or less is preferred. With respect to the method for obtaining a powdery form, there is no particular limitation, but, from the viewpoint of achieving excellent productivity of the powder, freeze-grinding is preferred.

In polyamide resin (A1) in polyamide resin composition B of the present invention, another polyamide resin can also be used in such an amount that the properties of the resultant molded article are not sacrificed.

Examples of other polyamide resins include polycaprolactam (polyamide 6), polyundecanelactam (polyamide 11), polydodecanelactam (polyamide 12), polyethyleneadipamide (polyamide 26), polytetramethyleneadipamide (polyamide 46), polyhexamethyleneadipamide (polyamide 66), polyhexamethyleneazelamide (polyamide 69), polyhexamethylenesebacamide (polyamide 610), polyhexamethyleneundecamide (polyamide 611), polyhexamethylenedodecamide (polyamide 612), polyhexamethyleneterephthalamide (polyamide 6T), polyhexamethyleneisophthalamide (polyamide 6I), polyhexamethylenehexahydroterephthalamide (polyamide 6T(H)), polynonamethyleneadipamide (polyamide 96), polynonamethyleneazelamide (polyamide 99), polynonamethylenesebacamide (polyamide 910), polynonamethylenedodecamide (polyamide 912), polynonamethyleneterephthalamide (polyamide 9T), polytrimethylhexamethyleneterephthalamide (polyamide TMHT), polynonamethylenehexahydroterephthalamide (polyamide 9T(H)), polynonamethylenenaphthalamide (polyamide 9N), polydecamethyleneadipamide (polyamide 106), polydecamethyleneazelamide (polyamide 109), polydecamethylenedecamide (polyamide 1010), polydecamethylenedodecamide (polyamide 1012), polydecamethyleneterephthalamide (polyamide 10T), polydecamethylenehexahydroterephthalamide (polyamide 10T(H)), polydecamethylenenaphthalamide (polyamide 10N), polydodecamethyleneadipamide (polyamide 126), polydodecamethyleneazelamide (polyamide 129), polydodecamethylenesebacamide (polyamide 1210), polydodecamethylenedodecamide (polyamide 1212), polydodecamethyleneterephthalamide (polyamide 12T), polydodecamethylenehexahydroterephthalamide (polyamide 12T(H)), polydodecamethylenenaphthalamide (polyamide 12N), polymetaxylyleneadipamide (polyamide MXD6), polymetaxylylenesuberamide (polyamide MXD8), polymetaxylyleneazelamide (polyamide MXD9), polymetaxylylenesebacamide (polyamide MXD10), polymetaxylylenedodecamide (polyamide MXD12), polymetaxylyleneterephthalamide (polyamide MXDT), polymetaxylyleneisophthalamide (polyamide MXDI), polymetaxylylenenaphthalamide (polyamide MXDN), polybis(4-aminocyclohexyl)methanedodecamide (polyamide PACM12), polybis(4-aminocyclohexyl)methaneterephthalamide (polyamide PACMT), polybis(4-aminocyclohexyl)methaneisophthalamide (polyamide PACMI), polybis(3-methyl-4-aminocyclohexyl)methanedodecamide (polyamide dimethylPACM12), polyisophoroneadipamide (polyamide IPD6), polyisophoroneterephthalamide (polyamide IPDT), and polyamide copolymers thereof. These can be used individually or in combination. Of these, preferred are polyamide 6, polyamide 12, polyamide 66, polyamide 6/66 copolymer (which indicates a copolymer of polyamide 6 and polyamide 66; hereinafter, a copolymer is indicated according to the same method), polyamide 6/12 copolymer, and polyamide 6/66/12 copolymer, and more preferred are polyamide 6, polyamide 66, polyamide 6/66 copolymer, and polyamide 6/12 copolymer.

In polyamide resin (A1) in polyamide resin composition B of the present invention, various additives and modifiers generally incorporated to a resin can be added in such an amount that the properties of the resultant molded article are not sacrificed. For example, a heat stabilizer, an ultraviolet light absorber, a light stabilizer, an antioxidant, an antistatic agent, a lubricant, an anti-blocking agent, a filler, a tackifier, a sealing property improving agent, an anti-fogging agent, a crystal nucleating agent, a release agent, a plasticizer, a crosslinking agent, a foaming agent, a coloring agent (e.g., a pigment or a dye), and the like can be added during or after the polymerization of the resin.

[At least one member selected from the group consisting of metal oxide (B1), nitrogen compound (B2), and silicon compound (B3)]

With respect to the average particle size of the at least one member selected from the group consisting of metal oxide (B1), nitrogen compound (B2), and silicon compound (B3) used in polyamide resin composition B of the present invention, there is no particular limitation, but, from the viewpoint of achieving excellent physical properties including impact resistance, the average particle size is especially preferably 0.1 to 200 μm, more preferably 1 to 150 μm, further preferably 5 to 100 μm. With respect to the form of the particles, there is no particular limitation, but, from the viewpoint of achieving excellent productivity and excellent moldability, preferred is a particulate form, particularly a round particulate form having a small specific surface area.

With respect to the specific surface area of the at least one member selected from the group consisting of metal oxide (B1), nitrogen compound (B2), and silicon compound (B3), there is no particular limitation, but the specific surface area is preferably 5 $m^2/g$ or less, more preferably 1 $m^2/g$ or less.

With respect to the purity of the at least one member selected from the group consisting of metal oxide (B1), nitrogen compound (B2), and silicon compound (B3), there is no particular limitation, but, from the viewpoint of obtaining excellent electrical insulating properties and excellent thermal conduction properties, the purity is preferably 70% by mass or more, more preferably 80% by mass or more, further preferably 90% by mass or more, especially preferably 95% by mass or more.

With respect to the apparent specific gravity of the at least one member selected from the group consisting of metal oxide (B1), nitrogen compound (B2), and silicon compound (B3), there is no particular limitation, but, from the viewpoint of achieving excellent handling properties in the production (prevention of scattering), the apparent specific gravity is preferably 0.1 $g/cm^3$ or more.

With respect to the surface treatment for the at least one member selected from the group consisting of metal oxide (B1), nitrogen compound (B2), and silicon compound (B3), there is no particular limitation, and examples include a silane coupling agent and organopolysiloxane.

Examples of metal oxides (B1) include aluminum oxide, magnesium oxide, beryllium oxide, and titanium oxide, and, from the viewpoint of obtaining excellent electrical insulating properties and excellent thermal conduction properties, preferred are aluminum oxide and magnesium oxide, and magnesium oxide is more preferred.

Examples of nitrogen compounds (B2) include boron nitride and aluminum nitride, and boron nitride is preferred.

As an example of silicon compound (B3), there can be mentioned calcium silicate whiskers.

One type or two types or more can be used.

In polyamide resin composition B of the present invention, with respect to the at least one member selected from the group consisting of metal oxide (B1), nitrogen compound (B2), and silicon compound (B3), preferred is metal oxide (B1) from the viewpoint of the availability of the raw material.

Polyamide resin composition B of the present invention comprises, relative to 100 parts by mass of polyamide resin (A1), preferably 25 to 900 parts by mass, more preferably 33 to 600 parts by mass, further preferably 42 to 300 parts by mass, especially preferably 100 to 250 parts by mass of at least one member selected from the group consisting of metal oxide (B1), nitrogen compound (B2), and silicon compound (B3).

In polyamide resin composition B, a thermoplastic polymer other than the polyamide, an elastomer, a filler, or reinforcing fibers can be added like the above-mentioned polyamide resin (A1) in such an amount that the desired effects are not sacrificed.

In polyamide resin composition B, if necessary, a stabilizer, such as a copper compound, a coloring agent, an ultraviolet light absorber, a light stabilizer, an antioxidant, an antistatic agent, a flame retardant, a crystallization promoter, glass fibers, a plasticizer, a lubricant, or the like can be further added.

With respect to the method for producing polyamide resin composition B of the present invention, there is no particular limitation, but, generally, there can be mentioned the following method.

First, polyamide resin (A1), at least one member selected from the group consisting of metal oxide (B1), nitrogen compound (B2), and silicon compound (B3), and an additive mentioned above as an arbitrary component are provided.

Then, polyamide resin (A1), at least one member selected from the group consisting of metal oxide (B1), nitrogen compound (B2), and silicon compound (B3), and an additive as an arbitrary component are mixed with one another using, e.g., a cylinder mixer. The resultant mixture is melt-kneaded by means of a known extruder, such as a twin-screw extruder, a single-screw extruder, a multi-screw extruder, a Banbury mixer, a roll mixer, or a kneader, to produce a polyamide resin composition.

Examples of methods for molding polyamide resin composition B of the present invention into a molded article include injection molding, extrusion, blow molding, press molding, roll molding, foam molding, vacuum or pressure forming, and stretch forming. Of these, preferred are methods by melt processing, such as injection molding, extrusion, blow molding, press molding, roll molding, and foam molding. Polyamide resin composition B of the present invention can be processed by the above molding method into, e.g., a molded article, a film, a sheet, or fibers.

The molded product using polyamide resin composition B of the present invention can be used in various types of molded articles in which a molded product of a polyamide resin composition has conventionally been used, and a wide variety of applications, such as sheets, films, pipes, tubes, monofilaments, fibers, automobiles, computers and associated devices, optical devices, information and communication devices, electric and electronic device parts for precision devices, civil engineering and construction products, medical products, and household products. The molded product using polyamide resin composition B is especially useful in applications of electric and electronic device parts, which require not only the inherent properties of the polyamide resin but also electrical insulating properties and thermal conduction properties.

[Polyamide Resin Composition C]

The present invention can be polyamide resin composition C which comprises polyamide resin (A) and metal oxide particles (BB) as the property imparting component, wherein metal oxide particles (BB) contain those having a particle size of 70 μm or more in an amount of 10 to 50% by mass and those having a particle size of 20 μm or less in an amount of 1 to 50% by mass, based on the total mass of the metal oxide particles, wherein metal oxide particles (BB) are contained in an amount of 70 to 85% by mass, based on the mass of the polyamide resin composition.

Polyamide resin (A) in polyamide resin composition C of the present invention can be produced in the same manner as in polyamide resin (A) described above in connection with polyamide resin composition A, and the same materials can be used and the same additives can be added.

The amount of polyamide resin (A) incorporated into polyamide resin composition C of the present invention is preferably 15 to 30% by mass, based on the mass of polyamide resin composition C. When the amount of polyamide resin (A) is less than 15% by mass, the resultant composition has a reduced resin component and hence becomes brittle, making it difficult to pelletize the strand. Further, the amount of the melted component (resin component) in the composition being kneaded is reduced to lower the fluidity, so that the kneading properties become poor. On the other hand, when the amount of polyamide resin (A) is more than 30% by mass, the amount of metal oxide particles (BB) incorporated is reduced, so that satisfactory thermal conduction properties cannot be exhibited. From the viewpoint of achieving excellent kneading properties and excellent thermal conduction properties, the amount of polyamide resin (A) incorporated into polyamide resin composition C is preferably 14.9 to 29.9% by mass, more preferably 20 to 25% by mass.

[Metal Oxide Particles (BB)]

Examples of metal oxide particles (BB) used in polyamide resin composition C of the present invention include particles of aluminum oxide, magnesium oxide, beryllium oxide, and titanium oxide, and, from the viewpoint of obtaining excellent electrical insulating properties and excellent thermal conduction properties, aluminum oxide and/or magnesium oxide is preferred, and magnesium oxide is more preferred.

In polyamide resin composition C of the present invention, metal oxide particles (BB), which are processed into a powdery form, are used, and, with respect to the average particle size of metal oxide particles (BB), there is no particular limitation, but, when the average particle size is less than 0.5 μm, the increased surface area may cause the particles to absorb too large an amount of moisture in air, and, when the average particle size is more than 300 the mechanical strength including impact strength is likely to lower, and magnesium oxide may be exposed through the surface of the molded article, causing the surface properties to become poor. Therefore, the average particle size of metal oxide particles (BB) is preferably 0.5 to 300 μm, more preferably 12 to 73 μm, further preferably 30 to 60 μm.

In polyamide resin composition C of the present invention, metal oxide particles (BB) contain those having a particle size of 70 μm or more in an amount of 10 to 50% by mass, preferably in an amount of 10 to 30% by mass from the viewpoint of achieving excellent physical properties including impact resistance, and contain those having a particle size of 20 μm or less in an amount of 1 to 50% by mass, from the viewpoint of achieving excellent stability of raw material transfer including feeding of raw materials during the kneading, more preferably in an amount of 15 to 45% by mass, based on the total mass of the metal oxide particles. Further, from the viewpoint of achieving excellent physical properties including impact resistance and excellent kneading properties, the metal oxide particles preferably contain metal oxide particles having a particle size of more than 20 to less than 70 μm in an amount of 40 to 70% by mass, more preferably 40 to 52% by mass.

Further, in polyamide resin composition C of the present invention, from the viewpoint of achieving excellent thermal conduction properties, metal oxide particles (BB) preferably have a purity of 80% by mass or more, more preferably 90% by mass or more, further preferably 95% by mass or more.

The amount of metal oxide particles (BB) incorporated into polyamide resin composition C of the present invention is 70 to 85% by mass, based on the mass of polyamide resin composition C. When the amount of metal oxide particles (BB) is less than 70% by mass, the amount of the resin in the composition is increased, so that satisfactory thermal conduction properties cannot be exhibited. When the amount of metal oxide particles (BB) is more than 85% by mass, the resultant strand has a reduced resin amount and hence becomes brittle, making it difficult to pelletize the strand during the kneading. From the viewpoint of achieving excellent thermal conduction properties and excellent kneading properties, the amount of metal oxide particles (BB) is preferably 70 to 85% by mass, more preferably 75 to 85% by mass.

It is preferred that polyamide resin composition C of the present invention further comprises the above-mentioned polyhydric alcohol (D). In polyamide resin composition C of the present invention, polyhydric alcohol (D) is preferably a polyhydric alcohol having a melting temperature of 150 to 280° C., and examples of such polyhydric alcohols include pentaerythritol, dipentaerythritol, and trimethylolethane, and these can be used in combination. From the viewpoint of achieving excellent kneading properties and excellent moldability, pentaerythritol and/or dipentaerythritol is preferred.

Further, the amount of polyhydric alcohol (D) incorporated into polyamide resin composition C of the present invention is preferably 0.1 to 5% by mass from the viewpoint of achieving excellent kneading properties and excellent moldability. From the viewpoint of surely obtaining fluidity of the composition and suppressing the generation of gas during the molding, the amount of polyhydric alcohol (D) is more preferably 0.5 to 3% by mass.

With respect to the method for producing polyamide resin composition C of the present invention, like the method for producing polyamide resin composition A, there is no particular limitation as long as the composition is produced by melt-kneading, and various types of methods conventionally known can be employed.

In polyamide resin composition C of the present invention, various additives and modifiers generally incorporated to a resin composition can be added in such an amount that the properties of the resultant molded article are not sacrificed. For example, a heat stabilizer, an ultraviolet light absorber, a light stabilizer, an antioxidant, an antistatic agent, a lubricant, an anti-blocking agent, a filler, an anti-fogging agent, a crystal nucleating agent, a release agent, a plasticizer, a crosslinking agent, a foaming agent, a coloring agent (e.g., a pigment or a dye), and the like can be added. With respect to the method for adding the above additive, there is no particular limitation, and, in addition to the above-mentioned methods for producing the composition, various types of methods conventionally known can be employed. For example, there can be mentioned a dry blending method.

A method for molding the obtained polyamide resin composition C into a molded article is the same method as described above in connection with polyamide resin composition A.

A thermal conductivity of the molded article obtained from polyamide resin composition C of the present invention is measured in accordance with JIS R-2616, and a difference between the maximum and minimum of the thermal conductivity, i.e., a thermal conductivity difference within the molded article is preferably 0.5 W/m~K or less.

The molded product using polyamide resin composition C of the present invention is used in the same applications as described above in connection with polyamide resin composition A.

Examples

Hereinbelow, the present invention will be described in more detail with reference to the following Examples, which should not be construed as limiting the scope of the present invention.

Examples 1 to 4 (polyamide resin composition A of the present invention) and Comparative Examples 1 to 8

Various evaluation methods and the raw materials used are shown below.

(Raw Materials Used)

[Polyamide Resin (A)]

Polyamide resin (A-1): Polyamide 6 (P1011F, manufactured by Ube Industries, Ltd., powder having an average particle size of 1 mm or less, which has passed through a 12-mesh screen; relative viscosity: 2.22; water extraction: 0.3% by mass; specific gravity: 1.14)

Polyamide resin (A-2): Polyamide 6 (P1022, manufactured by Ube Industries, Ltd., powder having an average particle size of 1 mm or less, which has passed through a 12-mesh screen; relative viscosity: 3.36; water extraction: 0.2% by mass; specific gravity: 1.14)

[Flake Graphite (B)]

Graphite (B-1): Flake graphite (SP-10, manufactured by Nippon Graphite Industries, Ltd.; average particle size: 20 μm; bulk specific gravity: 0.2 g/cc; fixed carbon content: 99% by mass; specific gravity: 2.23)

Graphite (B-2): Spherical graphite (LB-BG, manufactured by Nippon Graphite Industries, Ltd.; average particle size: 30 μm; bulk specific gravity: 0.6 g/cc; fixed carbon content: 99% by mass; specific gravity: 2.23)

[Carbon Fibers (C)]

Carbon fibers (C-1): PAN carbon fibers (TR06NEB3E, manufactured by Mitsubishi Rayon Co., Ltd.; fiber diameter: 7 μm; cut fiber length: 10 mm; specific gravity: 1.8)

[Polyhydric Alcohol (D)]

Polyhydric alcohol (D-1): Pentaerythritol (manufactured by The Nippon Synthetic Chemical Industry Co., Ltd.; melting temperature: 260° C.; specific gravity: 1.4)

(Evaluation Methods)

(1) Kneading Properties

In producing a polyamide resin composition using TEX44, which is a co-rotation twin-screw extruder, manufactured by The Japan Steel Works, Ltd., and which has a diameter of 44 mmΦ and an L/D of 35, under kneading conditions such that the preset temperature was 290° C., the screw speed was 200 rpm, and the discharge rate was 20 kg/hr, kneading properties were evaluated in accordance with the following criteria ○ and x.

x: The strand discharged from the kneader is brittle, and the strand is cut, so that the pelletization cannot be continuously performed for one hour or more. Alternatively, the load in kneading is as large as more than 150 A which is the upper limit of the allowable current load of the kneader.

○: The pelletization can be continuously performed for one hour or more, and further the load in kneading is not more than 150 A.

(2) Thermal Conduction Properties

Thermal conduction properties were measured in accordance with JIS R-2616 (non-steady hot wire probe method).

The thermal conduction properties were evaluated in accordance with the following criteria ⊚, ○, Δ, and x.

x: Less than 4 W/m·K

Δ: To less than 7 W/m·K

○: 7 To less than 10 W/m·K

⊚: 10 W/m·K or more (3) Tensile Strength

A tensile strength was measured in accordance with ASTM D-638.

The tensile strength was evaluated in accordance with the following criteria ○ and x.

○: The tensile strength is 50 MPa or more.

x: The tensile strength is less than 50 MPa.

Example 1

Materials, which had the weights calculated from their respective specific gravities so that, relative to 100 parts by volume of polyamide resin (A-1)(polyamide 6 P1011F, manufactured by Ube Industries, Ltd.), the amount of graphite (B-1)(flake graphite SP-10, manufactured by Nippon Graphite Industries, Ltd.) was 90 parts by volume, the amount of carbon fibers (C-1)(PAN carbon fibers TR06NEB3E, manufactured by Mitsubishi Rayon Co., Ltd.) was 10 parts by volume, and the amount of polyhydric alcohol (D-1)(pentaerythritol, manufactured by The Nippon Synthetic Chemical Industry Co., Ltd.) was 1 part by volume, were charged into a cylinder mixer and mixed with one another. The resultant mixture was introduced into a kneader TEX44, manufactured by The Japan Steel Works, Ltd., and melt-kneaded at a preset temperature of 290° C., a screw speed of 200 rpm, and a discharge rate of 20 kg/hr, and extruded into a strand form, and cooled in a water bath, and then pellets of a polyamide resin composition were obtained using a pelletizer. The kneading properties were evaluated when producing the polyamide resin composition. The obtained pellets of polyamide resin composition were subjected to injection molding under conditions such that the cylinder temperature was 290° C., the mold temperature was 80° C., and the cooling time was 20 seconds to prepare a 150 mm×150 mm×3 mm test specimen for measurement of a thermal conductivity and an ASTM No. 1 dumbbell specimen having a thickness of 3.2 mm for measurement of a tensile strength. Using the prepared specimens, thermal conduction properties and tensile strength were evaluated. The results are shown in Table 1.

Example 2

Pellets of a polyamide resin composition were produced in substantially the same manner as in Example 1 except that the amount of graphite (B-1)(flake graphite SP-10, manufactured by Nippon Graphite Industries, Ltd.) was changed to 80 parts by volume, and they were evaluated. The results are shown in Table 1.

Example 3

Pellets of a polyamide resin composition were produced in substantially the same manner as in Example 1 except that the amount of graphite (B-1)(flake graphite SP-10, manufactured by Nippon Graphite Industries, Ltd.) was changed to 80 parts by volume, and that the amount of carbon fibers (C-1)(PAN carbon fibers TR06NEB3E, manufactured by Mitsubishi Rayon Co., Ltd.) was changed to 20 parts by volume, and they were evaluated. The results are shown in Table 1.

Example 4

Pellets of a polyamide resin composition were produced in substantially the same manner as in Example 1 except that polyamide resin (A-1)(polyamide 6 P1011F, manufactured by Ube Industries, Ltd.) was changed to polyamide resin (A-2): polyamide 6 (P1022, manufactured by Ube Industries, Ltd.), and they were evaluated. The results are shown in Table 1.

Comparative Example 1

Pellets of a polyamide resin composition were produced in substantially the same manner as in Example 1 except that, relative to 100 parts by volume of polyamide resin (A-1) (polyamide 6 P1011F, manufactured by Ube Industries, Ltd.), the amount of graphite (B-1)(flake graphite SP-10, manufactured by Nippon Graphite Industries, Ltd.) was changed to 100 parts by volume and the amount of carbon fibers (C-1) (PAN carbon fibers TR06NEB3E, manufactured by Mitsubishi Rayon Co., Ltd.) was zero and they were mixed together using a cylinder mixer, and they were evaluated. The results are shown in Table 1.

Comparative Example 2

Pellets of a polyamide resin composition were produced in substantially the same manner as in Comparative Example 1 except that the amount of graphite (B-1)(flake graphite SP-10, manufactured by Nippon Graphite Industries, Ltd.) was changed to 80 parts by volume, and they were evaluated. The results are shown in Table 1.

Comparative Example 3

Pellets of a polyamide resin composition were produced in substantially the same manner as in Comparative Example 1 except that graphite (B-1)(flake graphite SP-10, manufactured by Nippon Graphite Industries, Ltd.) was changed to graphite (B-2)(spherical graphite LB-BG, manufactured by Nippon Graphite Industries, Ltd.), and they were evaluated. The results are shown in Table 1.

Comparative Example 4

Pellets of a polyamide resin composition were produced in substantially the same manner as in Comparative Example 1 except that 80 parts by volume of graphite (B-1)(flake graphite SP-10, manufactured by Nippon Graphite Industries, Ltd.) was changed to 100 parts by volume of carbon fibers (C-1) (PAN carbon fibers TR06NEB3E, manufactured by Mitsubishi Rayon Co., Ltd.), and they were evaluated. The results are shown in Table 1.

Comparative Example 5

Pellets of a polyamide resin composition were produced in substantially the same manner as in Example 1 except that polyhydric alcohol (D-1)(pentaerythritol, manufactured by The Nippon Synthetic Chemical Industry Co., Ltd.) was not mixed, and they were evaluated. The results are shown in Table 1.

Comparative Example 6

Pellets of a polyamide resin composition were produced in substantially the same manner as in Example 1 except that the amount of graphite (B-1)(flake graphite SP-10, manufactured by Nippon Graphite Industries, Ltd.) was changed to 60 parts by volume, and that the amount of carbon fibers (C-1)(PAN carbon fibers TR06NEB3E, manufactured by Mitsubishi Rayon Co., Ltd.) was changed to 40 parts by volume, and they were evaluated. The results are shown in Table 1.

Comparative Example 7

Pellets of a polyamide resin composition were produced in substantially the same manner as in Example 1 except that the amount of carbon fibers (B-1)(flake graphite SP-10, manufactured by Nippon Graphite Industries, Ltd.) was changed to 46 parts by volume, and the amount of carbon fibers (C-1) (PAN carbon fibers TR06NEB3E, manufactured by Mitsubishi Rayon Co., Ltd.) was changed to 8 parts by volume, and they were evaluated. The results are shown in Table 1.

Comparative Example 8

Pellets of a polyamide resin composition were produced in substantially the same manner as in Comparative Example 1 except that the amount of carbon fibers (B-1)(PAN carbon fibers TR06NEB3E, manufactured by Mitsubishi Rayon Co., Ltd.) was changed to 54 parts by volume, and they were evaluated. The results are shown in Table 1.

(3) Electrical Insulating Properties
Electrical insulating properties were measured in accordance with ASTM D-257.
(4) Thermal Conduction Properties
Thermal conduction properties were measured in accordance with JIS R-2616 (non-steady hot wire probe method).
(5) Tensile Strength
A tensile strength was measured in accordance with ASTM D-638.
(Raw Materials Used)
[Polyamide Resin (A1)]
Polyamide resin (A1-1): Polyamide 92
28.18 kg (139.3 mol) of dibutyl oxalate was charged into a pressure vessel having an internal volume of 150 litres and having a stirrer, a thermometer, a torque meter, a pressure gauge, a raw material inlet directly connected to a diaphragm pump, a nitrogen gas feed inlet, a vent port, a pressure regulator, and a polymer withdrawal outlet, and further the inside of the pressure vessel was pressurized with nitrogen gas having a purity of 99.9999% to 0.5 MPa, and then nitrogen gas was released until the pressure became atmospheric pressure,

TABLE 1

| | Polyamide resin (A) | | Graphite (B) | | Carbon fibers (C) | Polyhydric alcohol (D) | | Thermal conduction properties | | Physical properties Tensile strength | |
|---|---|---|---|---|---|---|---|---|---|---|---|
| | A-1 Parts by volume | A-2 Parts by volume | B-1 Parts by volume | B-2 Parts by volume | C-1 Parts by volume | D-1 Parts by volume | Kneading properties Judgment | Thermal conductivity W/m·k | Judgment | MPa | Judgment |
| Example 1 | 100 | | 90 | | 10 | 1.0 | ○ | 11.0 | ⊚ | 55 | ○ |
| Example 2 | 100 | | 80 | | 10 | 1.0 | ○ | 7.2 | ○ | 58 | ○ |
| Example 3 | 100 | | 80 | | 20 | 1.0 | ○ | 8.1 | ○ | 65 | ○ |
| Example 4 | | 100 | 90 | | 10 | 1.0 | ○ | 9.3 | ○ | 52 | ○ |
| Comparative Example 1 | 100 | | 100 | | | 1.0 | X | 8.4 | ○ | 40 | X |
| Comparative Example 2 | 100 | | 80 | | | 1.0 | X | 5.8 | Δ | 43 | X |
| Comparative Example 3 | 100 | | | 100 | | 1.0 | X | 3.9 | X | 45 | X |
| Comparative Example 4 | 100 | | | | 100 | 1.0 | X | 2.2 | X | 250 | ○ |
| Comparative Example 5 | 100 | | 90 | | 10 | | X | 6.4 | Δ | 55 | ○ |
| Comparative Example 6 | 100 | | 60 | | 40 | 1.0 | X | 2.3 | X | 80 | ○ |
| Comparative Example 7 | 100 | | 46 | | 8 | 1.0 | ○ | 2.4 | X | 62 | ○ |
| Comparative Example 8 | 100 | | 54 | | | 1.0 | ○ | 2.5 | X | 55 | ○ |

Examples 5 and 6 (Polyamide Resin Composition B of the Present Invention) and Comparative Examples 9 and 10

(Evaluation Methods)
(1) Relative Viscosity
A relative viscosity was measured at 25° C. using an Ostwald viscometer with respect to a solution using 96% by mass sulfuric acid as a solvent and having a polyamide resin concentration of 1.0 g/dl.
(2) Melting Temperature (Tm)
A melting temperature (Tm) was measured using PYRIS Diamond DSC, manufactured by PerkinElmer Co., Ltd., in a nitrogen gas atmosphere. The endothermic peak temperature obtained in the measurement was taken as a melting temperature.

and this operation was repeated 5 times to purge the vessel with nitrogen, and then the temperature in the system was increased under a pressure while stirring. The temperature of dibutyl oxalate was increased to 100° C. over about 30 minutes, and then a mixture of 18.74 kg (118.4 mol) of 1,9-nonamethylenediamine and 3.31 kg (20.9 mol) of 2-methyl-1,8-octanediamine(1,9-nonamethylenediamine:2-methyl-1, 8-octanediamine molar ratio is 85:15) was fed to the reaction vessel at a flow rate of 1.49 litter/minute using the diaphragm pump over about 17 minutes and the temperature was increased simultaneously with the feeding.
Immediately after the feeding, the internal pressure of the pressure vessel was increased to 0.35 MPa due to butanol formed by a condensation polymerization reaction, and the temperature of the condensation polymerization product was increased to about 170° C. Then, the temperature was increased to 235° C. over one hour. During the temperature increase, the internal pressure was adjusted to 0.5 MPa while withdrawing the formed butanol from the vent port. Immediately after the temperature of the condensation polymerization product reached 235° C., butanol was withdrawn from the vent port over about 20 minutes so that the internal pressure became 0.11 MPa (atmospheric pressure). At a point in time when the internal pressure became atmospheric pressure, the temperature increase was started while flowing nitrogen gas at 1.5 litter/minute, and the temperature of the condensation polymerization product was increased to 260° C. over about one hour, and a reaction was conducted at 260° C. for 4.5 hours. Then, stirring was stopped and the inside of the system was pressurized with nitrogen to 1 MPa and allowed to stand for about 10 minutes, and then vented until the internal pressure became 0.5 MPa, and the resultant condensation polymerization product was withdrawn in a strand form from the withdrawal outlet at the lower portion of the pressure vessel. The polymerization product in a strand form was immediately cooled with water, and the cooled resin in a strand form was pelletized by means of a pelletizer, obtaining polyamide resin (A1-1)(polyamide 92) in which the amount of the oxalic acid units is 100 mol %, based on the total mole of the dicarboxylic acid units. The obtained pellets were frozen with liquid nitrogen, and ground using a pin mill, and then a powder having an average particle size of 1 mm or less, which had passed through a 16-mesh screen, was obtained. The obtained polyamide resin (A1-1) had a relative viscosity of 2.76 and a melting temperature of 230° C.

Polyamide resin (A-1): Powdery polyamide 6 (P1011F, manufactured by Ube Industries, Ltd.; relative viscosity: 2.22)

[At Least One Member Selected from the Group Consisting of Metal Oxide (B1), Nitrogen Compound (B2), and Silicon Compound (B3)]

Metal oxide (B1)

Metal oxide (B1-1): Particulate magnesium oxide (RF-50-SC, manufactured by Ube Material Industries, Ltd.; average particle size: 63 μm; purity: 98% by weight; apparent specific gravity: 1.5 g/cm$^3$; specific surface area: 0.1 m$^2$/g)

Example 5

100 Parts by mass of polyamide resin (A1-1)(polyamide 92) and 213 parts by mass of metal oxide (B1-1)(magnesium oxide, manufactured by Ube Material Industries, Ltd.) were mixed with each other by means of a cylinder mixer. The resultant mixture was melt-kneaded at a preset temperature of 280° C. using a twin-screw extruder having a cylinder diameter of 44 mm and an L/D of 35, and extruded into a strand form, and cooled in a water bath, and then pellets of a polyamide resin composition were obtained using a pelletizer. The obtained polyamide resin composition was subjected to injection molding under conditions such that the cylinder temperature was 290° C., the mold temperature was 80° C., and the cooling time was 20 seconds to prepare a 150 mm×150 mm×3 mm test specimen for measurement of a thermal conductivity and a volume resistivity and an ASTM No. 1 dumbbell specimen having a thickness of 3.2 mm for measurement of a tensile strength. The obtained specimens were subjected to treatment in a thermostatic chamber under conditions at a temperature of 85° C. and at a relative humidity of 85% RH for 72 hours, and a thermal conductivity, a volume resistivity, and a tensile strength were measured with respect to the above-treated specimens and the untreated specimens. The results of the evaluation are shown in Table 2.

Example 6

Substantially the same procedure as in Example 5 was conducted except that the amount of metal oxide (B1-1)(magnesium oxide, manufactured by Ube Material Industries, Ltd.) was changed to 133 parts by mass. The results of the evaluation are shown in Table 2.

Comparative Example 9

Substantially the same procedure as in Example 5 was conducted except that polyamide resin (A1-1)(polyamide 92) was changed to polyamide resin (A-1)(polyamide 6, manufactured by Ube Industries, Ltd.). The results of the evaluation are shown in Table 2.

Comparative Example 10

Substantially the same procedure as in Example 6 was conducted except that polyamide resin (A1-1)(polyamide 92) was changed to polyamide resin (A-1)(polyamide 6, manufactured by Ube Industries, Ltd.). The results of the evaluation are shown in Table 2.

TABLE 2

|  |  | Example 5 | Example 6 | Comparative Example 9 | Comparative Example 10 |
|---|---|---|---|---|---|
| Polyamide resin (A1) |  | (A1-1) | (A1-1) | (A-1) | (A-1) |
| Parts by mass |  | 100 | 100 | 100 | 100 |
| At least one member selected from the group consisting of metal oxide (B1), nitrogen compound (B2), and silicon compound (B3) |  |  |  |  |  |
| Metal oxide (B1) |  | (B1-1) | (B1-1) | (B1-1) | (B1-1) |
| Parts by mass |  | 213 | 133 | 213 | 133 |
| Thermal conductivity [W/mK] | Before treatment | 1.17 | 0.85 | 1.23 | 0.89 |
|  | After treatment | 1.15 | 0.88 | 1.27 | 0.97 |
| Volume resistivity [Ω cm] | Before treatment | $6.1 \times 10^{15}$ | $1.4 \times 10^{16}$ | $4.5 \times 10^{14}$ | $1.2 \times 10^{15}$ |
|  | After treatment | $5.0 \times 10^{13}$ | $3.0 \times 10^{14}$ | $1.2 \times 10^{11}$ | $7.2 \times 10^{10}$ |
| Tensile strength [MPa] | Before treatment | 70 | 72 | 65 | 67 |
|  | After treatment | 66 | 68 | 31 | 31 |

In Examples 5 and 6, which correspond to polyamide resin composition B of the present invention, as can be clearly seen from Table 2, the lowering of the volume resistivity indicating electrical insulating properties and the tensile strength indicating mechanical strength due to the high-temperature and high-humidity treatment is suppressed, and the polyamide resin composition can exhibit excellent electrical insulating properties and thermal conduction properties as well as mechanical strength even under high-temperature and high-humidity conditions, and exhibits especially excellent electrical insulating properties after a high-temperature and high-humidity treatment, and hence can be preferably used as an electrical insulating material in an electrical insulating part.

Examples 7 to 9 (Polyamide Resin Composition C) and Comparative Examples 11 to 14

(Raw Materials Used)
[Polyamide Resin (A)]
  Polyamide resin (A-1): Polyamide 6 (P1011F, manufactured by Ube Industries, Ltd., powder having an average particle size of 1 mm or less, which has passed through a 12-mesh screen; relative viscosity: 2.22; water extraction: 0.3% by mass; specific gravity: 1.14)
[Metal Oxide Particles (BB)]
  Magnesium oxide (BB-1): Magnesium oxide (RF-70C-SC, manufactured by Ube Material Industries, Ltd.; average particle size: 7 μm; purity: 99%)
  Magnesium oxide (BB-2): Magnesium oxide (RF-50-SC, manufactured by Ube Material Industries, Ltd.; average particle size: 53 μm; purity: 98%)
  Magnesium oxide (BB-3): Magnesium oxide (RF-10C-SC, manufactured by Ube Material Industries, Ltd.; average particle size: 72 μm; purity: 99%)
[Polyhydric Alcohol (D)]
  Pentaerythritol (D-1)(manufactured by The Nippon Synthetic Chemical Industry Co., Ltd.; melting temperature: 260° C.; specific gravity: 1.4)
(Evaluation Methods)
(1) Kneading Properties
  Kneading properties were tested and evaluated in the same manner as in polyamide resin composition A.
(2) Thermal Conduction Properties
  Thermal conduction properties were measured in accordance with JIS R-2616 (non-steady hot wire probe method).
  A test piece of 150 mm×150 mm×3 mmt was used, and measurement was made with respect to three locations. The location of measurement near the gate shown in FIG. 1 was indicated by character A, and the middle portion was indicated by character B, and the end portion was indicated by character C.
  The thermal conductivity difference was obtained as a difference between the maximum and minimum of the thermal conductivities measured in the three locations.

Example 7

Polyamide resin (A-1) P1011F, manufactured by Ube Industries, Ltd., in an amount of 23.2% by mass, magnesium oxide (BB-1) RF-70C-SC, manufactured by Ube Material Industries, Ltd., in an amount of 7.6% by mass, magnesium oxide (BB-2) RF-50-SC, manufactured by Ube Material Industries, Ltd., in an amount of 37.9% by mass, magnesium oxide (BB-3) RF-10C-SC, manufactured by Ube Material Industries, Ltd., in an amount of 30.3% by mass, and pentaerythritol (D-1) in an amount of 1.0% by mass were mixed together.
  With respect to the particle size of magnesium oxide, particle size distributions of magnesium oxide (BB-1), magnesium oxide (BB-2), and magnesium oxide (BB-3) were measured by a laser diffraction scattering method in accordance with JIS R 1629, and, from the results of the particle size distributions, the amounts of the magnesium oxide having a particle size of 20 μm or less and the magnesium oxide having a particle size of 70 μm or more, based on the total mass of the magnesium oxide, were determined.
  The magnesium oxide incorporated had an average particle size of 37 μm, and the amount of the magnesium oxide having a particle size of 70 μm or more was 15% by mass and the amount of the magnesium oxide having a particle size of 20 μm or less was 41% by mass. (The amount of the magnesium oxide having a particle size 2 times or more the average particle size was 11% by mass, and the amount of the magnesium oxide having a particle size half or less of the average particle size was 41% by mass.)
  These were charged into a cylinder mixer and mixed with one another, and the resultant mixture was introduced into a kneader TEX44, manufactured by The Japan Steel Works, Ltd., and melt-kneaded at a preset temperature of 290° C., a screw speed of 200 rpm, and a discharge rate of 20 Kg/hr, and kneading properties were evaluated during the melt-kneading. The obtained pellets of polyamide resin composition were subjected to injection molding under conditions such that the cylinder temperature was 290° C., the mold temperature was 80° C., and the cooling time was 20 seconds to prepare a 150 mm×150 mm×3 mm test specimen for measurement of a thermal conductivity. Using the prepared specimen, thermal conduction properties were evaluated with respect to measurement locations A, B, and C. The results are shown in Table 3.

Example 8

Pellets of a polyamide resin composition were produced in substantially the same manner as in Example 7 except that the amount of magnesium oxide (BB-1) RF-70C-SC, manufactured by Ube Material Industries, Ltd., was changed to 30.3% by mass, that the amount of magnesium oxide (BB-2) RF-50-SC, manufactured by Ube Material Industries, Ltd., was 37.9% by mass, and that the amount of magnesium oxide (BB-3) RF-10C-SC, manufactured by Ube Material Industries, Ltd., was changed to 7.6% by mass, and they were evaluated. The results are shown in Table 3.
  The magnesium oxide incorporated has an average particle size of 52 μm, and the amount of the magnesium oxide having a particle size of 70 μm or more is 30% by mass and the amount of the magnesium oxide having a particle size of 20 μm or less is 21% by mass, based on the total mass of the magnesium oxide incorporated. (The amount of the magnesium oxide having a particle size 2 times or more the average particle size is 15% by mass, and the amount of the magnesium oxide having a particle size half or less of the average particle size is 24% by mass.)

Example 9

Pellets of a polyamide resin composition were produced in substantially the same manner as in Example 7 except that the amount of magnesium oxide (BB-1) RF-70C-SC, manufactured by Ube Material Industries, Ltd., was changed to 15.2% by mass, that the amount of magnesium oxide (BB-2) RF-50-SC, manufactured by Ube Material Industries, Ltd., was changed to 45.5% by mass, and that the amount of magnesium oxide (BB-3) RF-10C-SC, manufactured by Ube Material Industries, Ltd., was changed to 15.2% by mass, and they were evaluated. The results are shown in Table 3.

The magnesium oxide incorporated has an average particle size of 48 μm, and the amount of the magnesium oxide having a particle size of 70 μm or more is 22% by mass and the amount of the magnesium oxide having a particle size of 20 or less is 25% by mass, based on the total mass of the magnesium oxide mixed. (The amount of the magnesium oxide having a particle size 2 times or more the average particle size is 10% by mass, and the amount of the magnesium oxide having a particle size half or less of the average particle size is 26% by mass.)

Comparative Example 11

Pellets of a polyamide resin composition were produced in substantially the same manner as in Example 7 except that polyamide resin (A-1) P1011F, manufactured by Ube Industries, Ltd., in an amount of 23.2%, magnesium oxide (BB-2) RF-50-SC, manufactured by Ube Material Industries, Ltd., in an amount of 75.9% by mass, and pentaerythritol (D-1) in an amount of 1.0% by mass were mixed together, and they were evaluated. The results are shown in Table 3.

The magnesium oxide mixed has an average particle size of 52 μm, and the amount of the magnesium oxide having a particle size of 70 μm or more is 20% by mass and the amount of the magnesium oxide having a particle size of 20 μm or less is 0.0% by mass, based on the total mass of the magnesium oxide mixed. (The amount of the magnesium oxide having a particle size 2 times or more the average particle size is 2% by mass, and the amount of the magnesium oxide having a particle size half or less of the average particle size is 1% by mass.)

Comparative Example 12

Pellets of a polyamide resin composition were produced in substantially the same manner as in Example 7 except that polyamide resin (A-1) P1011F, manufactured by Ube Industries, Ltd., in an amount of 23.2%, magnesium oxide (BB-2) RF-50-SC, manufactured by Ube Material Industries, Ltd., in an amount of 30.3% by mass, magnesium oxide (BB-3) RF-10C-SC, manufactured by Ube Material Industries, Ltd., in an amount of 45.5% by mass, and pentaerythritol (D-1) in an amount of 1.0% by mass were mixed together, and they were evaluated. The results are shown in Table 3.

The magnesium oxide mixed has an average particle size of 11 μm, and the amount of the magnesium oxide having a particle size of 70 μm or more is 8% by mass and the amount of the magnesium oxide having a particle size of 20 μm or less is 56% by mass, based on the total mass of the magnesium oxide mixed. (The amount of the magnesium oxide having a particle size 2 times or more the average particle size is 42% by mass, and the amount of the magnesium oxide having a particle size half or less of the average particle size is 25% by mass.)

Comparative Example 13

Pellets of a polyamide resin composition were produced in substantially the same manner as in Example 7 except that the amount of polyamide resin (A-1) P1011F, manufactured by Ube Industries, Ltd., was changed to 24.2%, that the amount of magnesium oxide (BB-1) RF-70-SC, manufactured by Ube Material Industries, Ltd., was changed to 30.3% by mass, that the amount of magnesium oxide (BB-2) RF-50-SC, manufactured by Ube Material Industries, Ltd., was 37.9% by mass, and that the amount of magnesium oxide (BB-3) RF-10C-SC, manufactured by Ube Material Industries, Ltd., was changed to 7.6% by mass, and they were evaluated. The results are shown in Table 3.

The magnesium oxide mixed has an average particle size of 52 μm, and the amount of the magnesium oxide having a particle size of 70 μm or more is 30.0% by mass and the amount of the magnesium oxide having a particle size of 20 μm or less is 21.0% by mass, based on the total mass of the magnesium oxide mixed. (The amount of the magnesium oxide having a particle size 2 times or more the average particle size is 15% by mass, and the amount of the magnesium oxide having a particle size half or less of the average particle size is 24% by mass.)

Comparative Example 14

Substantially the same procedure for production as in Example 7 was conducted except that the amount of magnesium oxide (BB-1) RF-70-SC, manufactured by Ube Material Industries, Ltd., was changed to 75.9% by mass, and that the amounts of magnesium oxide (BB-2) RF-50-SC, manufactured by Ube Material Industries, Ltd., and magnesium oxide (BB-3) RF-10C-SC, manufactured by Ube Material Industries, Ltd., were changed to 0% by mass. However, the mixture could not be kneaded under good conditions, making it impossible to obtain pellets of a polyamide resin composition.

The magnesium oxide mixed has an average particle size of 74 μm, and the amount of the magnesium oxide having a particle size of 70 μm or more is 52.0% by mass and the amount of the magnesium oxide having a particle size of 20 μm or less is 30.0% by mass, based on the total mass of the magnesium oxide mixed. (The amount of the magnesium oxide having a particle size 2 times or more the average particle size is 16% by mass, and the amount of the magnesium oxide having a particle size half or less of the average particle size is 37% by mass.)

TABLE 3

| | | | Example 7 | Example 8 | Example 9 | Comparative Example 11 | Comparative Example 12 | Comparative Example 13 | Comparative Example 14 |
|---|---|---|---|---|---|---|---|---|---|
| Polyamide resin (A) | (A-1) | Mass % | 23.2 | 23.2 | 23.2 | 23.2 | 23.2 | 24.2 | 23.2 |
| Metal oxide (BB) | (BB-1) RF-70C-SC | Mass % | 7.6 | 30.3 | 15.2 | 0.0 | 0.0 | 30.3 | 75.9 |
| | (BB-2) RF-50-SC | Mass % | 37.9 | 37.9 | 45.5 | 75.9 | 30.3 | 37.9 | 0.0 |
| | (BB-3) RF-10C-SC | Mass % | 30.3 | 7.6 | 15.2 | 0.0 | 45.5 | 7.6 | 0.0 |
| | (BB-1, BB-2, BB-3) Total | Mass % | 75.9 | 75.9 | 75.9 | 75.9 | 75.9 | 75.9 | 75.9 |
| Based on total mass of metal oxide | 70 μm or more | Mass % | 15 | 30 | 22 | 20 | 8 | 30 | 52 |
| | More than 20 to less than 70 μm | Mass % | 45 | 48 | 53 | 80 | 36 | 48 | 18 |
| | 20 μm or less | Mass % | 41 | 21 | 25 | 0 | 56 | 21 | 30 |

TABLE 3-continued

|  |  |  | Example 7 | Example 8 | Example 9 | Comparative Example 11 | Comparative Example 12 | Comparative Example 13 | Comparative Example 14 |
|---|---|---|---|---|---|---|---|---|---|
| Polyhydric alcohol (D) | (D-1) | Mass % | 1.0 | 1.0 | 1.0 | 1.0 | 1.0 | 0.0 | 1.0 |
| Thermal conductivity | Measurement location A | W/m · k | 2.2 | 2.0 | 2.0 | 2.0 | 2.1 | 1.9 | Pellets cannot be obtained. |
|  | Measurement location B | W/m · k | 2.0 | 2.0 | 1.8 | 1.7 | 1.6 | 1.7 |  |
|  | Measurement location C | W/m · k | 1.9 | 1.9 | 1.8 | 1.3 | 1.4 | 1.1 |  |
|  | Thermal conductivity difference | W/m · k | 0.3 | 0.1 | 0.3 | 0.7 | 0.7 | 0.8 |  |
| Kneading properties |  | Judgment | ○ | ○ | ○ | ○ | X | X | X |

INDUSTRIAL APPLICABILITY

In the present invention, there can be provided a polyamide resin composition which is advantageous in that a molded article having excellent mechanical properties or electrical insulating properties and excellent thermal conduction properties can be obtained. Therefore, the molded article can be used in various types of molded articles in which a molded product of a polyamide resin composition has conventionally been used, and a wide variety of applications, such as sheets, films, pipes, tubes, monofilaments, fibers, automobiles, computers and associated devices, optical devices, information and communication devices, electric and electronic device parts for precision devices, civil engineering and construction products, medical products, and household products. The molded article is especially useful in applications of electric and electronic device parts, which require not only the inherent properties of the polyamide resin but also thermal conduction properties.

The invention claimed is:

1. A polyamide resin composition comprising a polyamide resin (A) and a property imparting component, the composition being:

a polyamide resin composition which consists essentially of the polyamide resin (A), metal oxide particles (BB) as the property imparting component, and a polyhydric alcohol (D), wherein the metal oxide particles (BB) consist of magnesium oxides and contain a first source providing a particle size of 70 μm or more in an amount of 10 to 50% by mass, a second source providing a particle size of more than 20 to less than 70 μm in an amount of 40 to 70% by mass and a third source providing a particle size of 20 μm or less in an amount of 1 to 50% by mass, based on the total mass of the metal oxide particles, wherein the metal oxide particles (BB) are contained in an amount of 70 to 85% by mass, based on the mass of the polyamide resin composition, and wherein the polyhydric alcohol (D) is contained in an amount of 0.1 to 5% by mass, based on the mass of the polyamide resin composition.

2. A molded article comprising the polyamide resin composition according to claim 1.

\* \* \* \* \*